March 22, 1960 A. F. VERDESCA 2,929,884

TELEPHONE DIALING DEVICE

Filed Aug. 19, 1957 2 Sheets-Sheet 1

INVENTOR.
ANTHONY F. VERDESCA
BY Harold D. Steinberg
Atty

March 22, 1960 A. F. VERDESCA 2,929,884

TELEPHONE DIALING DEVICE

Filed Aug. 19, 1957 2 Sheets-Sheet 2

INVENTOR.
ANTHONY F. VERDESCA
BY Harold D. Steinberg
Atty 2,929,884

TELEPHONE DIALING DEVICE

Anthony F. Verdesca, Fairview, N.J., assignor to Ver-Sa-Parts Mfg. Corp., Fairview, N.J., a corporation of New Jersey Application August 19, 1957, Serial No. 679,035

14 Claims. (Cl. 179—90)

The present invention relates to a dialing device for automatically performing the normally manual operations by which the selector dial of a telephone is turned for causing the transmission of impulse signals corresponding to a call number.

It is one object of the present invention to provide a dialing device which substantially reduces the number of manual operations associated with dialing a telephone number.

It is another object of the present invention to provide a dialing device which can be detachably attached to a standard telephone and permits the manual operation of the selector dial whenever desired.

It is another object of the present invention to provide a dialing device capable of automatically operating the selector dial of the telephone in a manner exactly corresponding to a manual operation.

It is another object of the present invention to provide a dialing device permitting selection of a call number by setting of an indicator, whereupon the respective dialing operation is automatically carried out.

It is another object of the present invention to provide a dialing device which interferes in no way with the transmission of impulse signals as carried out by the standard telephone apparatus.

A further object of the present invention is to provide a telephone dialing device employing a simple inexpensively manufactured selector disc for each preselected call number.

A further object of the present invention is to provide a dialing apparatus in which the selector dial of the telephone is mechanically separated from the dialing apparatus during the turning movement of the selector dial in return direction during which impulse signals are transmitted.

With these objects in view, the present invention mainly consists in a telephone dialing device for a telephone having a selector dial, the dialing device according to the present invention comprising transmissions connected with the selector dial for turning movement with the same and including a turnable pinion; at least one but preferably a plurality of selector discs, each selector disc having a set of spaced projecting segment portions and a corresponding set of recessed portions respectively located adjacent the segment portions and trailing the same in one direction of rotation of the selector discs; and means for turning the selector disc which is associated with the desired call number. Each segment portion and the associated recessed portion is associated with one order of a preselected call number and has a length proportionate to the turning angle of the selector dial which is required for dialing the digit in the respective order of the preselected call number. The segment portions successively engage the pinion during turning movement of the selector disc in one direction of rotation for intermittently turning the pinion through angles respectively corresponding to the digits of the preselected call number. Thereby, the selector is turned at intervals in dialing direction through angles respectively corresponding to the digits of the call number. Since the pinion engages only the projecting segment portions of the selector disc, it is free to turn with the selector dial in return direction while the respective recessed portions pass the pinion.

According to a preferred embodiment of the present invention, the transmissions means include friction wheel means and a gear pinion connected to the friction wheel means. The projecting segment portions of the selector discs have geared teeth and mesh with the geared pinion. When the support of the dialing device according to the present invention is attached to the housing of the telephone apparatus, the friction wheel means frictionally engage the selector dial of the telephone so that turning of a selector disc which is in meshing engagement with the gear pinion, will result in dialing of the respective call number. Means are provided for selectively associating the gear pinion with each of the selector discs of the dialing device.

According to one embodiment of the present invention a motor is provided which is coupled for a single revolution with the selector discs when the dialing of a called number is required.

According to another embodiment of the present invention a spring motor is provided, and is manually wound up. The spring motor is connected to the selector discs during its return movement, while a one-way clutch prevents turning of the selector discs during the winding of the spring motor.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
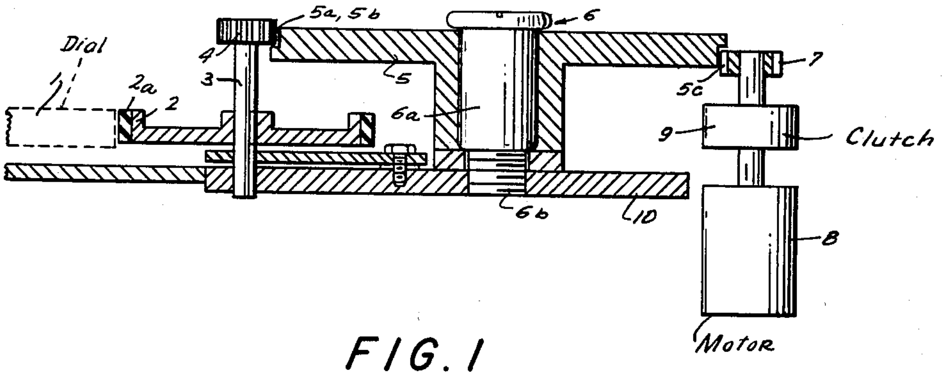
Fig. 1 is a schematic sectional view illustrating one embodiment of the present invention.
Figure 2:
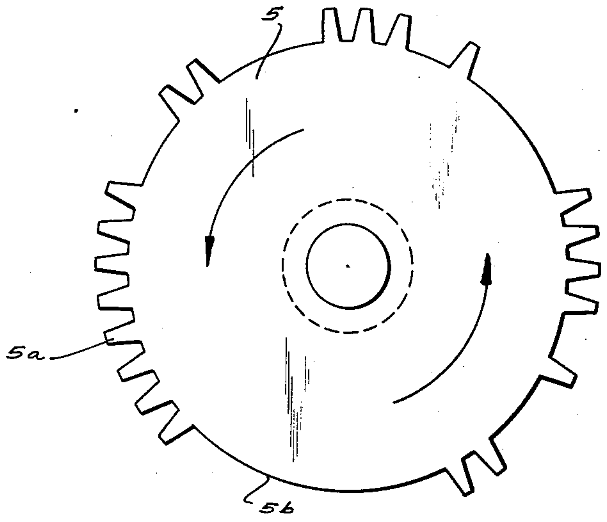
Fig. 2 is a view illustrating a selector disc according to the present invention.

Referring now to the drawings, and more particularly to Figures 1 and 2, the dialing device illustrated in Fig. 1 is mounted on a support plate 10 which is connected to the housing of the telephone apparatus, for example, by placing the telephone apparatus on an extension of the support plate 10. In this position of the device, the selector dial 1 of the telephone is in frictional engagement with the rubber rim *2a* of a friction wheel 2 which is secured to a shaft 3 carrying a gear pinion 4. Shaft 3 is turnably mounted in the support plate 10.

A selector disc is shown to be mounted on the support plate 10 by attaching means 6. The attaching means 6 include an axle portion *6a* on which the selector disc 5 is freely turnable, and a threaded portion *6b* which is secured to the base plate 10. If another selector disc 5 is to be used, the attaching means 6 are screwed out, the selector disc 5 exchanged, and the attaching means 6 are again secured to the base plate 10.

The selector discs according to the present invention have along the circumference thereof a set of projecting gear segment portions *5a* alternating with recessed spacing portions *5b*. Consequently, a recessed spacing portion *5b* trails each projecting gear segment portion *5a*. One gear segment portion *5a* is associated with each order of the respective call number, and the number of gear teeth, and the circumferential length of the respective gear segment portion $5a$ is proportional to the digit in the respective order of the call number represented by the selector disc. The length of the associated recessed spacing portions $5b$ is also proportional to the respective digit, and preferably equal to the length of the respective geared segment portion $5a$.

The selector disc illustrated in Fig. 2 represents the call number BU 2–1413. Since in a standard telephone apparatus, the character B corresponds to the digit 2, and the character U corresponds to the digit 8, the selector disc has a first gear segment portion having two gear teeth, or a multiple thereof, a second gear segment portion having eight teeth or a multiple thereof, and the following gear segment portions have numbers of teeth respectively proportional to the digits of the call number in the following order.

As pointed out above, each projecting gear segment portion $5a$ is trailed by an associated recessed portion $5b$ of proportional length.

Referring again to Fig. 1, the selector disc 5 is provided with the above described gear segment portions $5a$ and recessed portions $5b$ along the upper rim thereof. The lower rim $5c$ has continuous gear teeth along the entire circumference thereof, the gear teeth $5c$ meshing with a pinion 7 which is driven by a motor 8 through a single revolution clutch 9.

When the motor 8 and the clutch 9 are actuated the selector disc 5 is turned a single revolution, and during this revolution, the projecting gear segment portions $5a$ consecutively mesh with the gear pinion 4. However after each gear segment portion $5a$ has turned the pinion 4 through an angle corresponding to the number of teeth of the respective gear segment portion and to the digit reperesented by the same, the trailing recessed portion $5b$ passes the pinion 4, and the pinion 4 is released and not driven by the selector disc 5.

During meshing arrangement between the gear segment portion $5a$ and the pinion 4, the pinion 4 turns the friction wheel means 2, and thereby the selector dial 1 of the telephone. The transmission ratio of the transmission means 4, 3, 2 is so chosen that the selector dial is turned through an angle which corresponds to the digit represented by the respective gear segment portion $5a$ of the selector disc 5. It is apparent that such turning movement of the selector dial corresponds to the turning movement of the selector dial during a manual actuation. When the selector dial of a standard telephone is released, it returns to its initial position under the action of spring means, and impulses are transmitted during such return movement. A corresponding release of the selector dial 1 takes place in accordance with the present invention when a recessed spacing portion $5b$ passes the pinion 4. Since the pinion 4 is not engaged by the recessed portion $5b$, the spring means of the telephone which turn the selector dial, also turn the friction wheel means 2, the shaft 3, and the pinion 4 in return direction while effecting transmission of impulses corresponding to the respective digit.

During a single revolution of the selector disc 5, the projecting gear portions $5a$ consecutively actuate the selector dial 1, while the selector dial 1 returns automatically to initial position when the respective trailing recessed portions $5b$ passes the pinion 4. Since the selector disc 5 and the motive means 8, 7 are mechanically separated from the selector dial 1 during the return movement of the selector dial, the transmission of impulses is in no way influenced by the dialing apparatus of the present invention.

When it is desired to dial a different call number, the selector disc 5 is exchanged, whereupon the new call number can be dialed.

The embodiment of Fig. 1 illustrates a somewhat simplified construction, and in accordance with another embodiment of the present invention, a plurality of selector discs respectively associated with frequently used call numbers is mounted in the dialing device, and each selector disc can be selectively associated with the pinion from which the drive of the selector dial is derived.

Figure 3:
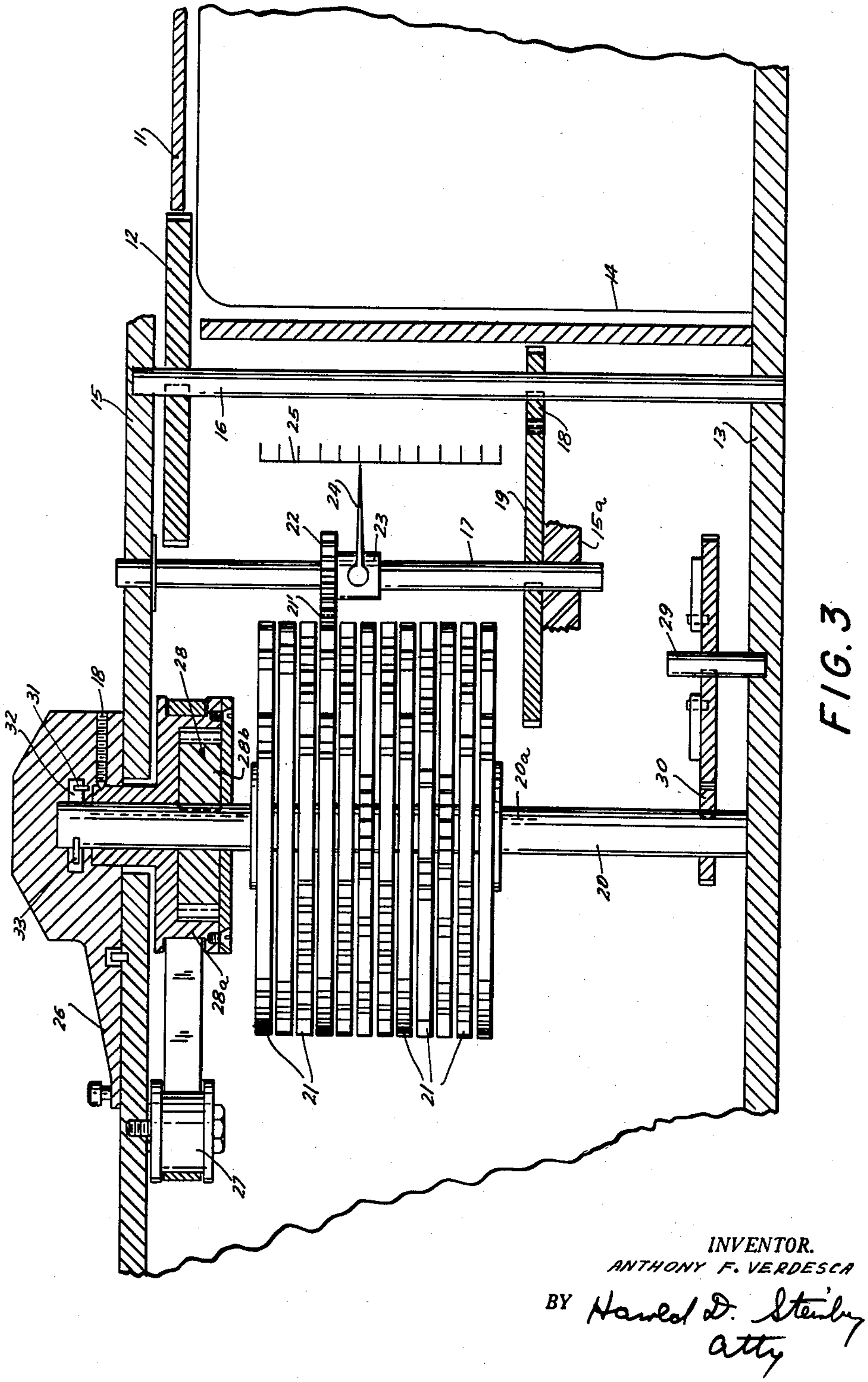
Fig. 3 is a fragmentary sectional view illustrating another embodiment of the present invention.

Referring now to Fig. 3, which illustrates a preferred embodiment of the present invention, the dial 11 of a telephone is in frictional engagement with a friction wheel 12 in operative condition of the dialing apparatus of the present invention. In order to obtain the necessary pressure between the wheel 12 and the dial 11, the dialing apparatus is provided with an extended base plate 13 on which the housing of the telephone is placed. Friction between the housing 14 and the base plate 13 will hold the telephone in the desired position in which the dial 11 is in frictional engagement with the friction wheel 12. If necessary, the telephone can be attached to the base plate 13 by screws passing through slots in the base plate 13.

The supporting means of the dialing device of the present invention further include a top plate 15, and the shaft 16 of the friction wheel is turnably mounted in the top plate 15 and in the base plate 13. Another shaft 17 is also mounted in the top plate 15 and in a supporting portion $15a$. A transmission is provided between shafts 16 and 17, and includes a first gear 18 fixed on shaft 16, and a second gear 19 fixed on shaft 17. Consequently, rotation of the shaft 17 will be transmitted through the transmission 18, 19 to the driving wheel 12, and from thereon to the dial 11.

A main shaft 20 is also mounted in the supporting means of the dialing apparatus, and is either splined or provided with a longitudinal groove $20a$. A plurality of selector discs of the type described with reference to Fig. 2 is mounted on shaft 20 and prevented by suitable keys engaging the groove $20a$ from turning movement relative to shaft 20. However, it will be apparent that the selector discs 21 can be easily removed from shaft 20, and replaced by other selector discs associated with different call numbers.

A gear pinion 22 has a sleeve 23 attached thereto, and is slidable on shaft 17 in axial direction, while being connected to shaft 17 for turning movement. The pinion 22 is shown in meshing engagement with the selector disc 21', and it will be understood that by shifting the gear pinion 22 in axial direction, it is possible to select any one of the selector discs 21 for driving pinion 22. An indicating pointer 24 is schematically shown to co-operate with an indicating scale 25 carrying indicia respectively associated with the different selector discs 21. When the operator places the indicating pointer 24 opposite a call number indicated on the scale 25, the selector disc 21 associated with the same call number is selected since it is brought into the meshing engagement with the pinion 22.

A handle is provided for actuating the dialing device. If the handle 26 were directly connected to the shaft 20, the rotary speed of the friction wheel 12, and thereby of the selector dial 11, would not be exactly uniform. Consequently, the handle 26 is used for winding up a spring motor 27. A pin 18 connects the handle 26 with the outer part $28a$ of a one-way clutch 28. The outer part $28a$ is connected to the spring motor 27, while the inner clutch part $28b$ is connected to the shaft 20. The construction and arrangement of the one-way clutch $20a$ is such, that turning of the handle by a manual operation will not effect turning of shaft 20, but only winding up of spring motor 27. When the spring motor 27 starts its return movement upon release of handle 26, the inner clutch part $28b$ is taken along by the outer clutch part $28a$, and shaft 20 is turned resulting in turning of the selector discs 21 and of the friction wheel 12 together with the selector dial 11. Consequently, the selector discs 21 and the selector dial 11 move at a uniform speed under the action of the spring motor 27. In order to assure a uniform speed, it is preferred to connect a governor 29 through gears 30 with shaft 20 whereby the rotary speed of shaft 20 is controlled.

Stop 31 is secured to the handle 26, and has a portion projecting into the annular recess 32 in the handle 26. A stop pin 33 is secured to shaft 20 and located in the annular recess 32, and when shaft 20 has completed a single revolution under the action of spring motor 27, the stop pin 33 engages the stop 31, and limits further movement of the shaft 20, and consequently of the friction wheel 12.

The apparatus is operated in the following manner: A call number is selected by placing the indicator pointer 24 opposite the respective number as indicated on the scale 25, whereby the pinion 22 is placed opposite the respective selector disc 21′ representing the respective selected call number. The selector discs are of the type illustrated in Fig. 2, and include a plurality of circumferential gear segment portions respectively associated with the digits in the orders of the respective call numbers, and have recessed spacing portions between the geared segment portions. Each gear segment portion turns the pinion 22, and thereby the selector dial 11. The associated trailing recessed portion of the selector disc passes the gear pinion 22 without engaging the same so that the gear pinion 22 can turn in return direction together with the dial 11 which is actuated by spring means in the telephone apparatus to return to initial position.

The circumferential length of each recessed spacing portion must be sufficient to permit return of the dial 11 to its initial position. Evidently, a longer time will be required for return of the dial to initial position if the digit 9 was dialed, and a shorter time will be required if the digit 1 was dialed. In order to expedite the dialing operation, the recessed spacing portions of the selector disc according to the present invention have a circumferential length proportional to the respective digit in the respective order of the call number. However, the recessed spacing portions can be made longer than would be required by the smaller digits, and in this event, the selector dial would remain in initial position for a short while, while the end of the respective longer recessed portion passes the pinion 22. The next following gear segment portion again engages the pinion 22 and effects turning of the selector dial 11 to an angular position associated with the respective digit which is to be selected in the respective order.

Of course the dialing operation will be performed in the shortest time, if the recessed spacing portions 5*b*, as shown in Fig. 2, have the minimum length just required for permitting the return of the selector dial to initial position. If the call number includes a number of low digits, such as 1, 2, 3, an extended recessed portion will be present between the gear segment portion 5*a* associated with the first order of the call number, and the gear segment portion 5*a* associated with the last order of the call number. Such extended recessed portion will have no influence on the dialing operation, and the respective selector disc will simply complete its single revolution until again arriving in initial position. Since the respective extended recessed portion passes the pinion 22 without turning the same, the friction wheel 12 and the selector dial are not actuated during the final turning movement of the selector disc, and the telephone conversation may be started even before the respective selector disc had returned to initial position. On the other hand, if the respective call number includes a number of high digits such as 9, it might be necessary to use the entire circumference of the selector disc for gear segment portions 5*a* and four recessed spacing portions 5*b* which are respectively proportional to the digits of the call number.

It will be understood that each of the elements described above, or two or more together, may also find a useful application in other types of telephone dialing apparatus differing from the types described above.

While the invention has been illustrated and described as embodied in a telephone dialing device, including a selector disc having a set of spaced projecting segment portions for actuating a telephone dial, and having a corresponding set of alternate recessed portions permitting return of the selector dial, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Telephone dialing device for a telephone having a selector dial, comprising, in combination, transmission means adapted to be connected with said selector dial for turning movement with the same and including a turnable pinion; a support; at least one selector disc mounted on said support for turning movement and having a set of spaced projecting segment portions and a corresponding set of recessed portions respectively located adjacent said segment portions and trailing the same in one direction of rotation of said selector disc, each segment portion and the associated recessed portion being associated with one order of a preselected call number, each segment portion having a length proportional to the turning angle of said selector dial required for dialing the digit in the respective order of said preselected call number, said segment portions successively engaging said pinion during turning movement of said selector disc in said one direction of rotation for intermittently turning said pinion through angles respectively corresponding to the digits of said preselected call number for turning the selector dial at intervals in dialing direction through angles respectively corresponding to the same digits, said pinion being free to turn with the selector dial in return direction while said recessed portions pass said pinion during turning movement of said selector disc in said one direction; motive means for turning said selector disc a single revolution in said one direction; and means for actuating said motive means.

2. Telephone dialing device for a telephone having a selector dial, comprising, in combination, transmission means adapted to be connected with said selector dial for turning movement with the same and including a turnable gear pinion; a support; at least one selector disk mounted on said support for turning movement and having a set of spaced projecting circumferential gear segment portions and a corresponding set of recessed portions respectively located adjacent said gear segment portions and trailing the same in one direction of rotation of said selector disc, each gear segment portion and the associated recessed portion being associated with one order of a preselected call number, each segment portion having a length proportional to the turning angle of said selector dial required for dialing the digit in the respective order of said preselected call number, said gear segment portions successively meshing with said gear pinion during turning movement of said selector disc in said one direction of rotation for intermittently turning said gear pinion through angles respectively corresponding to the digits of said preselected call number for turning the selector dial at intervals in dialing direction through angles respectively corresponding to the same digits, said gear pinion being free to turn with the selector dial in return direction while said recessed portions pass said gear pinion during turning movement of said selector disc in said one direction; motive means for turning said selector disc a single revolution in said one direction; and means for actuating said motive means.

3. Telephone dialing device for a telephone having a selector dial, comprising, in combination, a support; transmission means including friction wheel means turnably mounted on said support and adapted to frictionally engage said selector dial for turning movement with the same, and a gear pinion turnably mounted on said support and connected to said friction wheel means for rotation therewith; at least one selector disc mounted on said support for turning movement and having a set of spaced projecting circumferential gear segment portions and a corresponding set of recessed portions respectively located adjacent said gear segment portions and trailing the same in one direction of rotation of said selector disc, each gear segment portion and the associated recessed portion being associated with one order of a preselected call number, each segment portion having a length proportional to the turning angle of said selector dial required for dialing the digit in the respective order of said preselected call number, said gear segment portions successively meshing with said gear pinion during turning movement of said selector disc in said one direction of rotation for intermittently turning said gear pinion and said friction wheel means through angles respectively corresponding to the digits of said preselected call number for turning the selector dial at intervals in dialing direction through angles respectively corresponding to the same digits, said gear pinion and said friction wheel means being free to turn with the selector dial in return direction while said recessed portions pass said gear pinion during turning movement of said selector disc in said one direction; motive means for turning said selector disc a single revolution in said one direction; and means for actuating said motive means.

4. Telephone dialing device for a telephone having a selector dial, comprising, in combination, transmission means adapted to be connected with said selector dial for turning movement with the same and including a turnable pinion; a support; at least one selector disc mounted on said support for turning movement and having a set of spaced projecting segment portions and a corresponding set of recessed portions respectively located adjacent said segment portions and trailing the same in one direction of rotation of said selector disc, each segment portion and the associated recessed portion being associated with one order of a preselected call number, each segment portion having a length proportional to the turning angle of said selector dial required for dialing the digit in the respective order of said preselected call number, said segment portions successively engaging said pinion during turning movement of said selector disc in said one direction of rotation for intermittently turning said pinion through angles respectively corresponding to the digits of said preselected call number for turning the selector dial at intervals in dialing direction through angles respectively corresponding to the same digits, said pinion being free to turn with the selector dial in return direction while said recessed portions pass said pinion during turning movement of said selector disc in said one direction; a spring motor; a one-way clutch connecting said spring motor with said selector disc and being operative in said one direction of rotation of said selector disc; means for winding up said spring motor; stop means for limiting turning movement of said selector disc in said one direction of rotation to a single revolution.

5. Telephone dialing device for a telephone having a selector dial, comprising, in combination, a support; transmission means including friction wheel means turnably mounted on said support and adapted to frictionally engage said selector dial for turning movement with the same, and a gear pinion turnably mounted on said support and connected to said friction wheel means for rotation therewith; at least one selector disc mounted on said support for turning movement and having a set of spaced projecting circumferential gear segment portions and a corresponding set of recessed portions respectively located adjacent said gear segment portions and trailing the same in one direction of rotation of said selector disc, each gear segment portion and the associated recessed portion being associated with one order of a preselected call number, each segment portion and each recessed portion associated therewith having a length proportional to the turning angle of said selector dial required for dialing the digit in the respective order of said preselected call number, said gear segment portions successively meshing with said gear pinion during turning movement of said selector disc in said one direction of rotation for intermittently turning said gear pinion and said friction wheel means through angles respectively corresponding to the digits of said preselected call number for turning the selector dial at intervals in dialing direction through angles respectively corresponding to the same digits, said gear pinion and said friction wheel means being free to turn with the selector dial in return direction while said recessed portions pass said gear pinion during turning movement of said selector disc in said one direction; motive means for turning said selector disc a single revolution in said one direction; and means for actuating said motive means.

6. Telephone dialing device for a telephone having a selector dial, comprising, in combination, transmission means adapted to be connected with said selector dial for turning movement with the same and including a turnable pinion; a support; at least one selector disc mounted on said support for turning movement and having a set of spaced projecting segment portions and a corresponding set of recessed portions respectively located adjacent said segment portions and trailing the same in one direction of rotation of said selector disc, each segment portion and the associated recessed portion being associated with one order of a preselected call number, each segment portion having a length proportional to the turning angle of said selector dial required for dialing the digit in the respective order of said preselected call number, said segment portions successively engaging said pinion during turning movement of said selector disc in said one direction of rotation for intermittently turning said pinion through angles respectively corresponding to the digits of said preselected call number for turning the selector dial at intervals in dialing direction through angles respectively corresponding to the same digits, said pinion being free to turn with the selector dial in return direction while said recessed portions pass said pinion during turning movement of said selector disc in said one direction; motor means mounted on said support; a single revolution coupling means connecting said motor means with said selector disc; and means for operating said single revolution coupling means to move to operative position.

7. Telephone dialing device for a telephone having a selector dial, comprising, in combination, transmission means adapted to be connected with said selector dial for turning movement with the same and including a turnable pinion; a support; a plurality of coaxial selector discs mounted on said support for turning movement, each selector disc having a set of spaced projecting segment portions and a corresponding set of recessed portions respectively located adjacent said segment portions and trailing the same in one direction of rotation of said selector disc, each segment portion and the associated recessed portion being associated with one order of a preselected call number associated with the respective selector disc, each segment portion having a length proportional to the turing angle of said selector dial required for dialing the digit in the respective order of said preselected call number; means for selectively associating a single selector disc with said pinion, said segment portions of said selectively associated single selector disc successively engaging said pinion during turning movement of said selector disc in said one direction of rotation for intermittently turning said pinion through angles respectively corresponding to the digits of said preselected call number for turning the selector dial at intervals in dialing direction through angles respectively corresponding to the same digits, said pinion being free to turn with the selector dial in return direction while said recessed portions pass said pinion during turning movement of said selector disc in said one direction; motive means for turning said selector disc a single revolution in said one direction; and means for actuating said motive means.

8. Telephone dialing device for a telephone having a selector dial, comprising, in combination, a support; transmission means including friction wheel means turnably mounted on said support and adapted to frictionally engage said selector dial for turning movement with the same, and a gear pinion turnably mounted on said support and connected to said friction wheel means for rotation therewith; a plurality of coaxial selector discs mounted on said support for turning movement, each selector disc having a set of spaced projecting circumferential gear segment portions and a corresponding set of recessed portions respectively located adjacent said gear segment portions and trailing the same in one direction of rotation of said selector disc, each gear segment portion and the associated recessed portion being associated with one order of a preselected call number associated with the respective selector disc, each segment portion having a length proportional to the turning angle of said selector dial required for dialing the digit in the respective order of said preselected call number; means for selectively associating a single selector disc with said pinion, said gear segment portions of said selectively associated single selector disc successively meshing with said gear pinion during turning movement of said selector disc in said one direction of rotation for intermittently turning said gear pinion and said friction wheel means through angles respectively corresponding to the digits of said preselected call number for turning the selector dial at intervals in dialing direction through angles respectively corresponding to the same digits, said gear pinion and said friction wheel means being free to turn with the selector dial in return direction while said recessed portions pass said gear pinion during turning movement of said selector disc in said one direction; motive means for turning said selector disc a single revolution in said one direction; and means for actuating said motive means.

9. Telephone dialing device for a telephone having a selector dial, comprising, in combination, a support; transmission means including friction wheel means turnably mounted on said support and adapted to frictionally engage said selector dial for turning movement with the same, and a gear pinion turnably mounted on said support movable in axial direction and connected to said friction wheel means for rotation therewith; a shaft mounted on said support for turning movement; a plurality of coaxial selector discs mounted on and connected to said shaft for turning movement, each selector disc having a set of spaced projecting circumferential gear segment portions and a corresponding set of recessed portions respectively located adjacent said gear segment portions and trailing the same in one direction of rotation of said selector disc, each gear segment portion and the associated recessed portion being associated with one order of a preselected call number associated with the respective selector disc, each segment portion having a length proportional to the turning angle of said selector dial required for dialing the digit in the respective order of said preselected call number; means for moving said pinion in axial direction of said selector discs between a plurality of positions, said pinion being associated and located opposite a single selector disc in each of said positions, said gear segment portions of the respective single selector disc successively meshing with said gear pinion during turning movement of said selector disc in said one direction of rotation for intermittently turning said gear pinion and said friction wheel means through angles respectively corresponding to the digits of said preselected call number for turning the selector dial at intervals in dialing direction through angles respectively corresponding to the same digits, said gear pinion and said friction wheel means being free to turn with the selector dial in return direction while said recessed portions pass said gear pinion during turning movement of said selector disc in said one direction; motive means for turning said selector disc a single revolution in said one direction; and means for actuating said motive means.

10. Telephone dialing device for a telephone having a selector dial, comprising, in combination, a support; transmission means including friction wheel means turnably mounted on said support and adapted to frictionally engage said selector dial for turning movement with the same, and a gear pinion turnably mounted on said support movable in axial direction and connected to said friction wheel means for rotation therewith; a shaft mounted on said support for turning movement; a plurality of coaxial selector discs mounted on and connected to said shaft for turning movement, each selector disc having a set of spaced projecting circumferential gear segment portions and a corresponding set of recessed portions respectively located adjacent said gear segment portions and trailing the same in one direction of rotation of said selector disc, each gear segment portion and the associated recessed portion being associated with one order of a preselected call number associated with the respective selector disc, each segment portion having a length proportional to the turning angle of said selector dial required for dialing the digit in the respective order of said preselected call number; means for moving said pinion in axial direction of said selector discs between a plurality of positions, said pinion being associated and located opposite a single selector disc in each of said positions, said gear segment portions of the respective single selector disc successively meshing with said gear pinion during turning movement of said selector disc in said one direction of rotation for intermittently turning said gear pinion and said friction wheel means through angles respectively corresponding to the digits of said preselected call number for turning the selector dial at intervals in dialing direction through angles respectively corresponding to the same digits, said gear pinion and said friction wheel means being free to turn with the selector dial in return direction while said recessed portions pass said gear pinion during turning movement of said selector disc in said one direction; motive means; coupling means connecting said motive means with said shaft; means for limiting turning movement of said shaft in said one direction of rotation to a single revolution; and indicating means connected to said pinion for movement in axial direction of the same for indicating said positions of said pinion whereby said indicating means indicate the selector disc selected for operation of said dial, said indicating means having a plurality of indicia respectively associated with the call numbers of said selector discs.

11. Telephone dialing device for a telephone having a selector dial, comprising, in combination, transmission means adapted to be connected with said selector dial for turning movement with the same and including a turnable member; a support; at least one selector member mounted on said support for movement in one direction and having a set of spaced projecting portions and a corresponding set of recessed portions respectively located adjacent said projecting portions and trailing the same in said direction of movement, each projecting portion and the associated recessed portion being associated with one order of a preselected call number, each projecting portion having a length proportional to the turning angle of said selector dial required for dialing the digit in the respective order of said preselected call number, said projecting portions successively engaging said turnable member during movement of said selector member in said one direction until all said projecting portions have engaged said turnable member for intermittently turning said turnable member through angles respectively corresponding to the digits of said preselected call number for turning the selector dial at intervals in dialing direction through angles respectively corresponding to the same digits, said turnable member being released by said selector member while said recessed portions pass said turnable member during movement of said selector member in said one direction so that the selector dial is free to turn in return direction; and means for moving said selector member.

12. Telephone dialing device for a telephone having a selector dial, comprising, in combination, transmission means adapted to be connected with said selector dial for turning movement with the same and including a turnable member; a support; at least one selector member mounted on said support for turning movement in one direction and having a set of spaced projecting portions and a corresponding set of recessed portions respectively located adjacent said projecting portions and trailing the same in said direction of turning movement, each projecting portion and the associated recessed portion being associated with one order of a preselected call number, each projecting portion having a length proportional to the turning angle of said selector dial required for dialing the digit in the respective order of said preselected call number, said projecting portions successively engaging said turnable member during movement of said selector member in said one direction until all said projecting portions have engaged said turnable member for intermittently turning said turnable member through angles respectively corresponding to the digits of said preselected call number for turning the selector dial at intervals in dialing direction through angles respectively corresponding to the same digits, said turnable member being released by said selector member while said recessed portions pass said turnable member during turning movement of said selector member in said one direction so that the selector dial is free to turn in return direction; and means for turning said selector member.

13. Telephone dialing device for a telephone having a selector dial, comprising, in combination, transmission means adapted to be connected with said selector dial for turning movement with the same and including a turnable member; a support; a plurality of co-axial selector members mounted on said support for turning movement in one direction, each selector member having a set of spaced projecting portions and a corresponding set of recessed portions respectively located adjacent said projecting portions and trailing the same in said direction of turning movement, each projecting portion and the associated recessed portion being associated with one order of a preselected call number associated with the respective selector member, each projecting portion having a length proportional to the turning angle of said selector dial required for dialing the digit in the respective order of said preselected call number; means for selectively associating a single selector member with said turnable member, said projecting portions of said selectively associated single selector member successively engaging said turnable member during movement of said selector member in said one direction until all said projecting portions have engaged said turnable member for intermittently turning said turnable member through angles respectively corresponding to the digits of said preselected call number for turning the selector dial at intervals in dialing direction through angles respectively corresponding to the same digits, said turnable member being released by said selector member while said recessed portions pass said turnable member during turning movement of said selector member in said one direction so that the selector dial is free to turn in return direction; and means for turning at least said selected single selector member.

14. Telephone dialing device for a telephone having a selector dial, comprising, in combination, transmission means adapted to be connected with said selector dial for turning movement with the same and including a turnable member; a support; a plurality of selector members mounted on said support for movement in one direction, each selector member having a set of spaced projecting portions and a corresponding set of recessed portions respectively located adjacent said projecting portions and trailing the same in said direction of movement, each projecting portion and the associated recessed portion being associated with one order of a preselected call number associated with the respective selector member, each projecting portion having a length proportional to the turning angle of said selector dial required for dialing the digit in the respective order of said preselected call number; means for selectively associating a single selector member with said turnable member, said projecting portions of said selectively associated single selector member successively engaging said turnable member during movement of said selector member in said one direction until all said projecting portions have engaged said turnable member for intermittently turning said turnable member through angles respectively corresponding to the digits of said preselected call number for turning the selector dial at intervals in dialing direction through angles respectively corresponding to the same digits, said turnable member being released by said selector member while said recessed portions pass said turnable member during movement of said selector member in said one direction so that the selector dial is free to turn in return direction; and means for moving at least said selected single selector member.

References Cited in the file of this patent

UNITED STATES PATENTS

| | | |
|---|---|---|
| 2,044,527 | Green | June 16, 1936 |
| 2,195,519 | MacKenzie | Apr. 2, 1940 |
| 2,763,727 | Demeulenaere | Sept. 18, 1956 |